United States Patent [19]

Marshall et al.

[11] 3,739,290

[45] June 12, 1973

[54] ACOUSTIC SURFACE WAVE DEVICES

[75] Inventors: Frank Grahma Marshall, Edward George Sydney Paige, both of West Malvern, England

[73] Assignee: The Secretary of State for Defence in Her Britannic Majesty's Government of the United Kingdom of Great Britain and Northern Ireland, London, England

[22] Filed: May 2, 1972

[21] Appl. No.: 249,574

[30] Foreign Application Priority Data

May 5, 1971 Great Britain .................. 13,125/71

[52] U.S. Cl. ...................................... 330/5.5, 333/6

[51] Int. Cl. ............................................. H03f 3/04

[58] Field of Search ...................................... 330/5.5

[56] References Cited

UNITED STATES PATENTS 3,678,401 7/1972 Adler .................................. 330/5.5

*Primary Examiner*—Roy Lake
*Assistant Examiner*—Darwin R. Hostetter
*Attorney*—Moore & Hall

[57] ABSTRACT

Acoustic surface wave amplifier devices wherein a coupler comprising at least several spaced filamentary conductors formed over a surface across the path of acoustic surface waves, is used to couple the acoustic surface waves to a semiconductor body mounted in close proximity to but electrically insulated from the filamentary conductors so that an electron drift established in the semiconductor body will amplify the acoustic surface waves. The semiconductor body may be mounted alongside a substrate in which the acoustic surface waves are propagated, or over the path of the acoustic surface waves, or over part of the substrate adjacent to the path of the acoustic surface waves. The part of the coupler under the semiconductor body may be isolated from the substrate by a pad of non-piezoelectric material or by the semiconductor body.

9 Claims, 8 Drawing Figures

ACOUSTIC SURFACE WAVE DEVICES

BACKGROUND OF THE INVENTION

The present invention relates to acoustic surface wave and acoustic interface wave devices. The term 'acoustic surface waves' will be used hereinafter to include acoustic interface waves as well as acoustic surface waves.

Acoustic surface wave devices are being proposed for an increasingly large number of electronic purposes, and acoustic surface wave filters and delay lines are likely to find important applications in the future. Such devices commonly comprise a transducer for launching acoustic surface waves along a predetermined track (which must be along a surface or an interface of a meterial capable of supporting acoustic surface waves, but need not have any other particular configuration or boundaries) and at least one other transducer for detecting the acoustic surface waves and generating electrical signals in response to the acoustic surface waves. The transducers used conventionally comprise interdigitated comb-like electrodes. If such electrodes are deposited on a piezoelectric material, the application of alternating electric signals of suitable frequency across the electrodes will tend to propagate an acoustic surface wave orthogonal to the interleaved digits of the comb-like electrodes. Conversely, the passage of an acoustic surface wave orthogonal to the digits will induce a corresponding alternating electrical signal between the electrodes. It is also known that such transducers can operate effectively on an electrostrictive material, if a biassing electric field is applied to the material under the transducers. The transducers may be designed to achieve filtering effects.

It is known that acoustic surface waves can be amplified by devices in which an electron drift current is established in a semiconductor material very close and parallel to the path of the acoustic surface waves, if the electron drift velocity in the semiconductor is made greater than the velocity of the acoustic surface wave. This amplification was originally achieved with a semiconductor material supported very close to but not touching an acoustic surface wave track; however, it was found that the semiconductor material had to be within a few hundred Angstrom units of the acoustic surface wave track, yet any random unwanted contacts between the semiconductor and the acoustic surface wave track would interfere with the propagation of the acoustic surface wave and make the device unsatisfactory. Thus the known arrangement demanded very stringent tolerances on the flatness of both the semiconductor and the acoustic surface wave track, and on their assembly. The total voltage needed to maintain the required electron drift velocity over a desired length of the semiconductor was also found inconveniently high in some applications. To overcome this, the desired length of semiconductor material could be divided into sections, and a smaller voltage applied to each section; however since the connections to the individual sections necessarily take up some space, a longer acoustic surface wave track is then required, and the difficult flatness requirement must be met over a larger area of the acoustic wave propagating material.

It is an object of the present invention to provide alternative forms of acoustic surface wave amplifiers, which may be less difficult to manufacture.

SUMMARY OF THE INVENTION

According to the present invention there is provided an acoustic surface wave amplifier including a material capable of propagating acoustic surface waves along a surface of the material, acoustic surface wave coupling means comprising at least several spaced filamentary conductors formed over the said surface for causing acoustic surface waves on the surface to interact with electric signals induced on the said filamentary conductors, and semiconductor material mounted in close proximity to but electrically insulated from the said filamentary conductors, so that when an electron drift, of velocity greater than the velocity of the acoustic waves, is established in the semiconductor material across the direction of the filamentary conductors, acoustic surface waves propagating orthogonally to the filamentary conductors will be amplified.

The use of acoustic wave coupling means, as herein described, allows the semiconductor part of the amplifier to be separated from the acoustic surface wave track, and thereby allows embodiments to be designed which are comparatively easy to make.

The material of the track in which the acoustic surface waves are propagated may be a piezoelectric material, in which case the coupling means may simply consist of the plurality of filamentary electrical conductors extending over the track in a direction orthogonal to the direction of the acoustic surface waves and extending over another part of the amplifier on which the semiconductor material is mounted. The filamentary electrical conductors need not have any electrical interconnections.

Alternatively, the said material may be an electrostrictive material, in which case the coupling means must also include means for applying a biassing electric field to the material in the track under the filamentary conductors. Arrangements using electrostrictive material in a similar manner have been more fully described in the specification of Paige U.S. Pat. No. 3,678,305 issued July 18, 1972, for "Acoustic Surface Wave Devices".

As another alternative the coupling means may utilize the electric motor effect. In this case the filamentary conductors are connected at their ends to form closed circuits, and means are provided for maintaining a magnetic field, orthogonal to the filamentary conductors, over the region of the track where the interaction is required.

As yet another alternative, the coupling means may utilize the magnetostrictive effect. In this case the said material must be a magnetostrictive material which does not short-circuit the electric signals induced on the filamentary conductors, the filamentary conductors are connected at their ends to form closed circuits and means are provided for applying a biassing magnetic field to the material in the track under the filamentary conductors.

The device may be formed on a surface of any piece of suitable material, or on a thin layer of suitable material deposited on a substrate, or it may be formed on any substrate able to support acoustic surface waves with a thin film, of suitable material for achieving the desired form of coupling action, deposited on the substrate only over the region where a coupling action is desired.

The device may be covered with a film or layer of protective material, thus covering the surface on which the conductors are deposited. Care should be taken to avoid using any protective material which would cause excessive damping of the acoustic surface waves.

The filamentary conductors of the coupling means may be separated by equal spaces, by monotonically varied spaces, or by spaces varied in any regular of random manner. However the maximum spacing of any pair of adjacent filamentary conductors should be shorter than half a wavelength of the highest frequency acoustic surface wave to be amplified, in the material of the track.

The simplest, and preferred form of coupling is the piezoelectric form. The descriptions and explanations hereinafter given refer to embodiments having piezoelectric coupling, that is to say having at least a layer of piezoelectric material or bulk piezoelectric material over or under the region where electro-acoustic coupling is required, except where a specific reference to some other form of coupling is made. However, it should be remembered that in most cases corresponding structures could be formed using the alternative forms of coupling described hereinabove.

BRIEF DESCRIPTION OF DRAWINGS

Various embodiments of the invention using piezoelectric coupling means will now be described by way of example, with reference to the accompanying drawings, of which.

DESCRIPTION OF THE PREFERRED EMBODIMENTS

Figure 1:
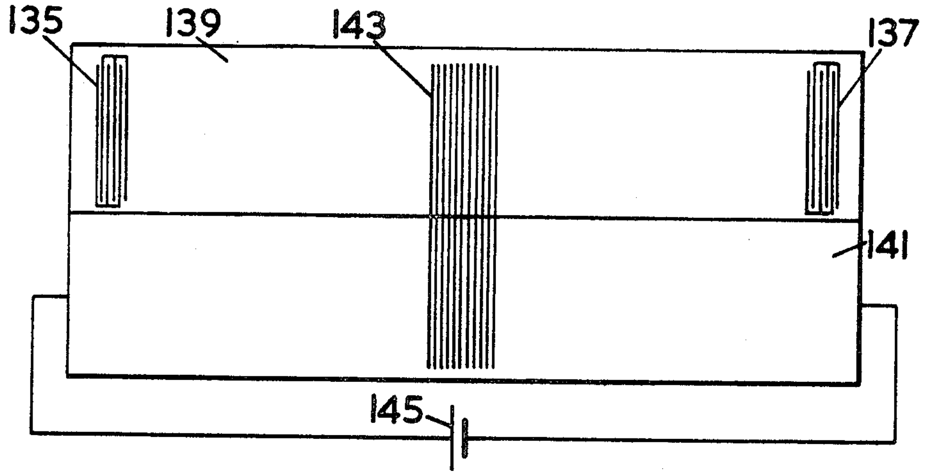
FIGS. 1, 2, 3 and 4 are plan views of alternative acoustic surface wave amplifiers.

FIG. 1 is a plan view of an acoustic surface wave amplifier. Two interdigital comb transducers 135 and 137 are deposited parallel to each other at opposite ends of a piezoelectric substrate 139. A body of semiconductor material 141 is held adjacent to the substrate 139 (for example by mounting on a common base, not shown) so that the upper surfaces of the material 141 and the substrate 139 are co-planar. The upper surface of the semiconductor body 141 is coated with a very thin film of electrically insulating material. A multistrip coupler 143, comprising a plurality of spaced filamentary conductors, aligned parallel to the transducers 135 and 137 (orthogonal to the direction of propagation of acoustic surface waves launched by the transducer 135 and received by the transducer 137) is formed over the substrate 139 and over the insulating film on the semiconductor material 141. The ends of the semiconductor body 141 are connected across a voltage source, schematically represented as a battery 145. The transducers 135 and 137 will have conventional electrical connections (not shown) to external circuits, but the filamentary conductors of the coupler 143 need not have any external connections and should be electrically insulated from each other. It should be noted that FIG. 1 and the other plan drawings are schematic, in as much as they do not attempt to show the width of each filamentary conductor or to show the required number of filamentary conductors accurately.

The action of the device is as follows. Acoustic surface waves launched in the substrate 139 by the transducer 135 cause electric fields to be set up between adjacent conductors in the coupler 143 so that these fields are transferred to the semiconductor body 141. The fields interact with the drifting electrons in the semiconductor body 141. When the electron drift velocity in the semiconductor exceeds the acoustic surface wave velocity, energy is transferred to the acoustic surface wave causing it to be amplified. The amplified acoustic surface wave can be collected by the transducer 137 or otherwise used.

This basic arrangement has the advantage that a comparatively easily attainable tolerance can be allowed on the flatness and relative alignment of the parts 139 and 141. Conventional methods for forming the filamentary conductors can ensure that the conductors will be in sufficiently close proximity to the piezoelectric material 139 and the semiconductor material 141 to allow the desired interactions to occur, without creating any really difficult assembly problems. Moreover the whole assembly can be easily inspected after mounting.

Figure 2:
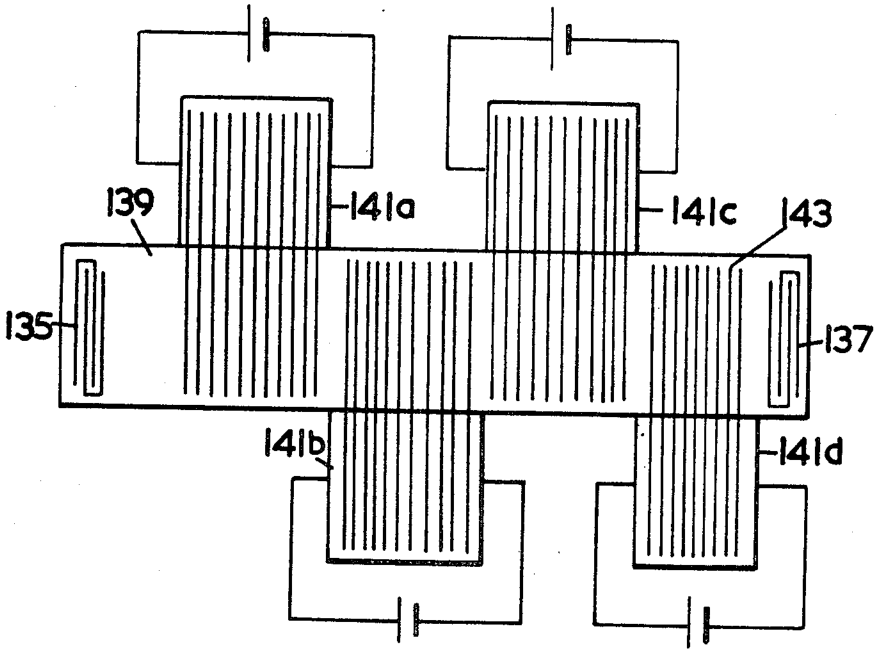

As in conventional acoustic surface wave amplifiers the technique of segmentation may be used to reduce the voltage drive necessary. However, by using the invention adjacent segments of the semiconductor may be positioned on opposite sides of the acoustic surface wave track so that no length penalty is incurred. FIG. 2 shows an amplifier in which the semiconductor body has been provided in four parts 141*a*, 141*b*, 141*c* and 141*d*, shown connected to separate voltage sources. A quarter of the coupler conductors 143 extend on to each of the sections of the semiconductor body.

Figure 3:
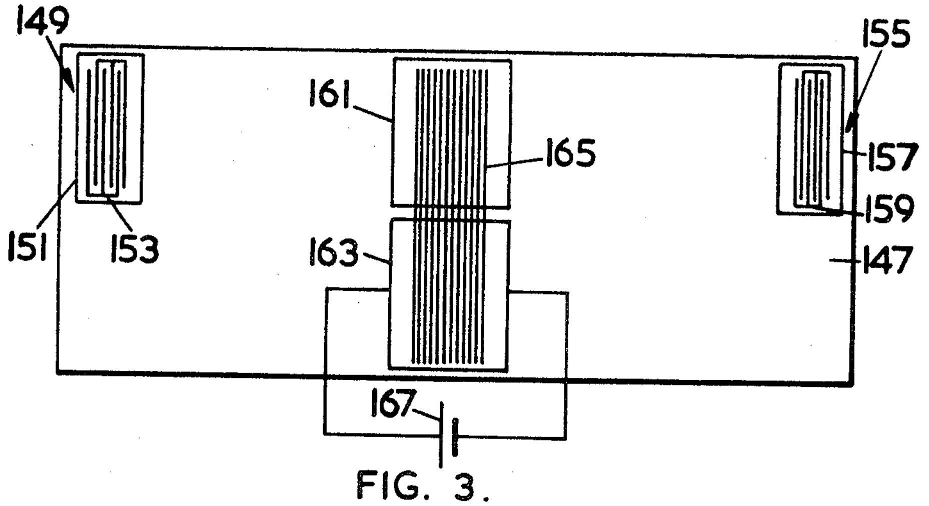

FIG. 3 is a plan view of an alternative acoustic surface wave amplifier. A substrate 147 of material, not piezoelectric but able to support acoustic surface waves, has deposited on it a launching pad 149 consisting of a piezoelectric film 151 on which is deposited an interdigital comb transducer 153, and in line with the launching pad 149 it has a receiving pad 155 consisting of a piezoelectric film 157 on which is deposited an interdigital comb transducer 159. Between the launching pad 149 and the receiving pad 155 a further piezoelectric film 161 is deposited. A semiconductor film 163 is deposited adjacent to the piezoelectric film 161 but not on the track between the launching pad 149 and the receiving pad 155. The semiconductor film 163 is covered with a very thin film of electrically insulating material. A multistrip structure 165 is deposited across the piezoelectric film 161 and the semiconductor film 163. A voltage source 167 is connected across the semiconductor film 163 to cause an electron drift in the film in the direction parallel to the direction of propagation of acoustic surface waves in the substrate 147. The substrate 147 may be made of sapphire with the piezoelectric films 151, 157 and 161 made of aluminum nitride and the semiconductor film 163 made of silicon.

This amplifier acts like the amplifier of FIG. 1, but because the substrate 147 is not piezoelectric, the electroacoustic interactions can only take place on the regions covered by the piezoelectric films 151, 157 and 161 where they are wanted, and therefore some spurious effects may be avoided. The conductors 165 can be on top of films 161, 163 as described above, or said conductors 165 can be placed directly on substrate 147 with films 161, 163 deposited on top of them, with film 161 being positioned in the track between transducers 153 and 159 and film 163 being positioned adjacent said track as shown in FIG. 3.

Figure 4:
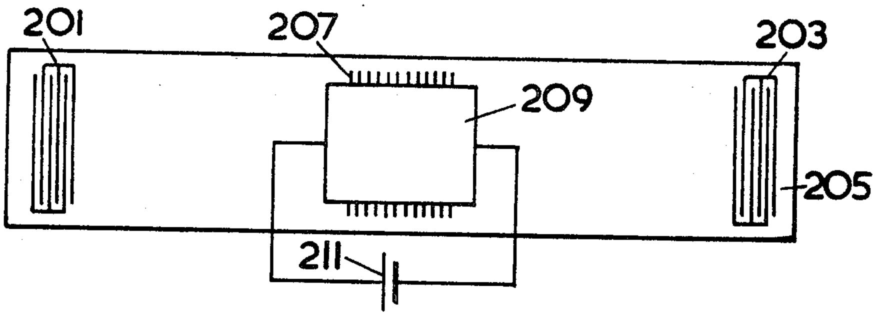

FIG. 4 shows an alternative arrangement, in which the semiconductor material 209 is bonded over a very thin electrically insulating film, on top of the conductors of a multistrip coupler 207, directly over the path of acoustic surface waves launched from a transducer 201 towards a transducer 203.

In co-pending U.S. application Ser. No. 249,573 filed May 2, 1972 by the same applicants and inventors, it is described how a multistrip coupler structure such as the structures 143 and 165 can transfer energy from an acoustic surface wave in one part of a substrate to form another acoustic wave in another part of the substrate also crossed by the conductors of the coupler. Where parts of a multistrip coupler are required only to couple the acoustic surface wave to a semiconductor to achieve amplification, it is desirable to ensure that these parts cannot waste energy and create spurious signals by launching unwanted acoustic surface waves. One solution is to adopt an arrangement as in FIG. 1 or FIG. 2 or FIG. 3 — that is to say have piezoelectric material only where electroacoustic interactions are required. However, it may be convenient to mount the semiconductor part of an acoustic surface wave amplifier on a piezoelectric substrate, and in such cases various other techniques may be employed to inhibit the launching of unwanted acoustic surface waves in parts of the substrate under the semiconductor material.

One convenient technique is to isolate the parts of the coupler under the semiconductor by a pad of suitable material, preferably material having a comparatively low dielectric constant, for instance silica. This is illustrated in FIGS. 5 and 6.

Figure 5:
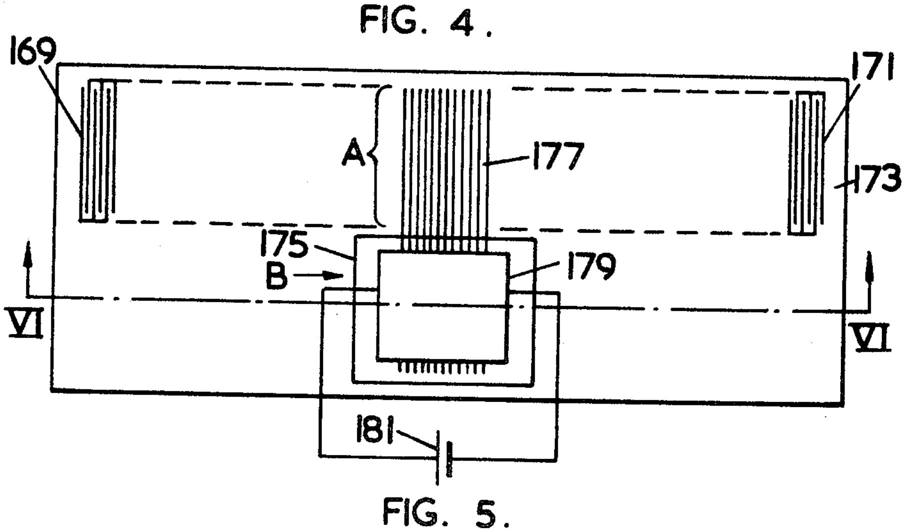
FIG. 5 is a plan view and FIG. 6 is a cross-section of a modified form of acoustic surface wave amplifier.
Figure 6:
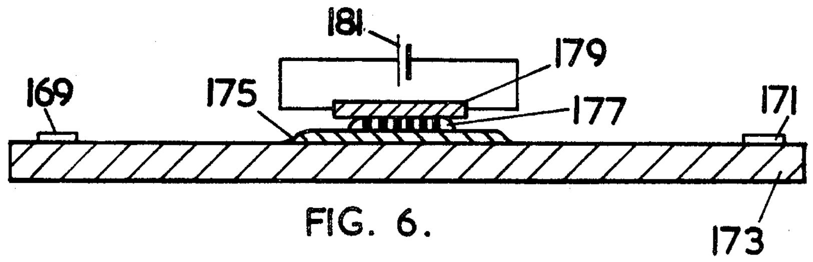

FIG. 5 is a plan view and FIG. 6 is a cross-sectional diagram of another alternative embodiment of the invention. Two interdigital comb transducers 169 and 171 are deposited parallel to each other at opposite ends of an acoustic surface wave track A on a piezoelectric substrate 173. A pad 175 of silica is deposited on the substrate 173 adjacent to the track A. A multistrip coupling structure 177 is deposited across the acoustic surface wave track A and extends over the silica pad 175. A semiconductor body 179 having a very thin insulating film on its underside, is mounted over the structure 177, and a voltage source 181 is connected across the semiconductor body 179 to cause an electron drift therein parallel to the direction of acoustic surface waves in the track A.

Acoustic surface waves launched in the track A by the transducer 169 cause electric fields to be set up between the conductors of the coupler 177. The electron drift in the semiconductor 179 transfers energy to the electric fields on the conductors of the coupler, and this interacts with the acoustic surface wave in the track A to amplify it. However, the silica pad 175 separates the coupler conductors 177 sufficiently from the part of the piezoelectric substrate under the pad 175 to prevent any direct electroacoustic interaction between them in this region.

If the semiconductor material itself were put in the place of a silica pad, that is to say between the piezoelectric substrate and the coupler conductors, it should have a screening as well as a separating effect, and should therefore effectively prevent any direct electroacoustic interaction in the region covered by the semiconductor.

Figure 7:
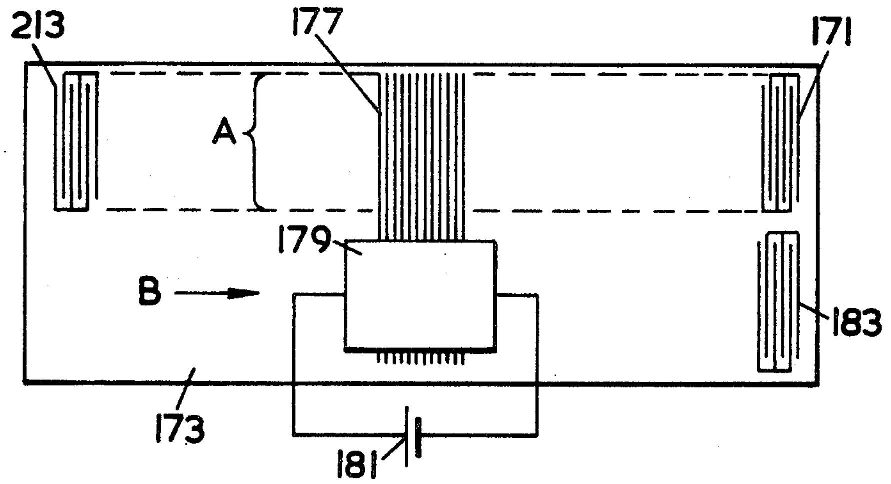
FIGS. 7 and 8 are plan views of alternative modifications of the acoustic surface wave amplifier of FIG. 5.

Even if the semiconductor 179 is mounted as shown in FIGS. 5 and 6 and the silica pad 175 is omitted, so that the coupler conductors are not isolated from the piezoelectric substrate, the semiconductor material may be judiciously chosen and biassed so as to have a loading effect which will inhibit acoustic surface waves in the piezoelectric material immediately under it, while still acting in the desired manner as hereinbefore described to amplify the acoustic surface waves propagated in the track A. This arrangement is shown in FIG. 7. If the semiconductor 179 is made non-conductive by biassing, some of the acoustic wave energy will be transferred to the additional transducer 183.

Figure 8:
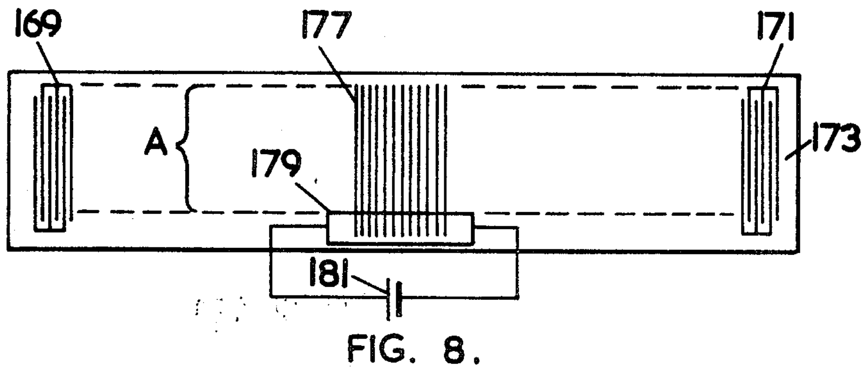

Another technique for inhibiting unwanted electroacoustic interaction under the semiconductor is simply to make the semiconductor 179 considerably narrower than the acoustic surface wave track A. A coupler such as 177 will only inefficiently transfer a limited proportion of the available acoustic surface wave energy from a wide track A to a much narrower adjacent track. Thus the construction shown in FIG. 8 at least limits the amount of possible unwanted interaction, and of course it can be applied in combination with the techniques of separation and loading control described with reference to FIGS. 5 and 7.

We claim:

1. An acoustic surface wave amplifier comprising a surface formed on an elastic material capable of propagating acoustic surface waves along the said surface, acoustic surface wave coupling means comprising at least several spaced filamentary conductors formed over the said surface for causing interaction between acoustic surface waves propagated along the said surface across the filamentary conductors and electrical signals induced on the said conductors, semiconductor material mounted in close proximity to but electrically insulated from the said filamentary conductors, and means for establishing an electron drift, of velocity greater than the velocity of the acoustic surface waves, in the semiconductor material across the direction of the filamentary conductors, so that acoustic surface waves propagating along the said surface orthogonally to the filamentary conductors will be amplified.

2. An acoustic surface wave amplifier as claimed in claim 1 wherein the said elastic material is a piezoelectric material.

3. An acoustic surface wave amplifier as claimed in claim 1, formed on a non-piezoelectric substrate able to support acoustic surface waves, having a deposit of the said elastic material over a region where the said interaction is required.

4. An acoustic surface wave amplifier as claimed in claim 1, wherein the said semiconductor material is disposed adjacent to the said elastic material and has a surface substantially co-planar with the surface of the elastic material along which the acoustic surface waves will be propagated, and the said filamentary conductors of the coupling means are formed over both surfaces.

5. An acoustic surface wave amplifier as claimed in claim 4, comprising a plurality of regions of semiconductor material adjacent to the said elastic material, disposed alternately on opposite sides of the elastic material, each having a coupling means comprising filamentary conductors extending over the elastic material for interacting with acoustic surface waves therein and extending over but electrically insulated from the semiconductor material, and means for establishing an electron drift across the filamentary conductors in each region of semiconductor material, of velocity greater than the velocity of the acoustic surface waves.

6. An acoustic surface wave amplifier as claimed in claim 3, formed on a sapphire substrate having a layer of piezoelectric aluminum nitride formed over or under a part of the coupling means in the track of the acoustic surface waves, wherein the said semiconductor material is a layer of silicon formed on the sapphire over or under a part of the coupling means adjacent to the track of the acoustic surface waves.

7. An acoustic surface wave amplifier as claimed in claim 1 wherein a thin film of electrically insulating material is formed over the filamentary conductors and the said semiconductor material is formed as a thin layer over the said thin film.

8. An acoustic surface wave amplifier as claimed in claim 1, wherein parts of the coupling means, not over the track of the acoustic surface waves which are to be amplified, are formed over a layer of non-piezoelectric material of comparatively low dielectric constant.

9. An acoustic surface wave amplifier as claimed in claim 1, wherein the track of the acoustic surface waves to be amplified extends over more than half the area of the coupling means.

* * * * *